United States Patent
Virtej et al.

(10) Patent No.: US 12,232,198 B2
(45) Date of Patent: Feb. 18, 2025

(54) ENHANCED BLIND CONFIGURATION OF A CELL

(71) Applicant: Nokia Solutions and Networks Oy, Espoo (FI)

(72) Inventors: Elena Virtej, Espoo (FI); Mikko Saily, Laukkoski (FI); Wolfgang Zirwas, Munich (DE); Tero Henttonen, Espoo (FI); Ingo Viering, Munich (DE); Lars Dalsgaard, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 309 days.

(21) Appl. No.: 17/627,360

(22) PCT Filed: Jun. 26, 2020

(86) PCT No.: PCT/EP2020/067993
§ 371 (c)(1),
(2) Date: Jan. 14, 2022

(87) PCT Pub. No.: WO2021/008857
PCT Pub. Date: Jan. 21, 2021

(65) Prior Publication Data
US 2022/0271884 A1 Aug. 25, 2022

(30) Foreign Application Priority Data
Jul. 17, 2019 (FI) ..................................... 20195644

(51) Int. Cl.
*H04W 76/15* (2018.01)
*H04L 5/00* (2006.01)

(52) U.S. Cl.
CPC ............. *H04W 76/15* (2018.02); *H04L 5/001* (2013.01)

(58) Field of Classification Search
CPC ....................................................... H04L 76/15
See application file for complete search history.

(56) References Cited

U.S. PATENT DOCUMENTS

2014/0029514 A1   1/2014   Yu et al.
2014/0307582 A1   10/2014  Dalsgaard et al.
(Continued)

FOREIGN PATENT DOCUMENTS

CN   105517067 A    4/2016
EP   2 793 506 A1   10/2014
(Continued)

OTHER PUBLICATIONS

International Search Report & Written Opinion in International Application No. PCT/EP2020/067993 mailed Sep. 10, 2020.
(Continued)

*Primary Examiner* — Kevin C. Harper
(74) *Attorney, Agent, or Firm* — Lippes Mathias LLP

(57) ABSTRACT

Disclosed is a method comprising providing a primary cell capable of serving a terminal device; determining a candidate secondary cell group, comprising one or more cells that have coverage area within the coverage are of the primary cell; determining, from the candidate secondary cell group, a cell that, based on information obtained before or during a connection setup signalling, has the highest probability of being successfully configured as a secondary cell for an inter-site carrier aggregation for the terminal device; and configuring the cell as the secondary cell for the inter-site carrier aggregation.

14 Claims, 8 Drawing Sheets

(56) References Cited

U.S. PATENT DOCUMENTS

| | | | |
|---|---|---|---|
| 2015/0003418 A1 | 1/2015 | Rosa et al. | |
| 2015/0087316 A1* | 3/2015 | Bostrom | H04L 5/0058 |
| | | | 455/438 |
| 2015/0223125 A1* | 8/2015 | Lu | H04W 36/326 |
| | | | 455/440 |
| 2016/0286449 A1 | 9/2016 | Choi et al. | |
| 2016/0338131 A1 | 11/2016 | Godin et al. | |
| 2017/0339714 A1* | 11/2017 | Harada | H04L 5/0012 |
| 2017/0359747 A1 | 12/2017 | Lunden et al. | |
| 2018/0324624 A1 | 11/2018 | Gu et al. | |
| 2018/0324850 A1 | 11/2018 | Amuru et al. | |
| 2019/0037425 A1 | 1/2019 | Hong et al. | |
| 2019/0246442 A1* | 8/2019 | Park | H04W 76/27 |

FOREIGN PATENT DOCUMENTS

| | | |
|---|---|---|
| EP | 2 978 261 A1 | 1/2016 |
| EP | 3 167 653 B1 | 2/2019 |
| WO | WO 2016/206733 A1 | 12/2016 |

OTHER PUBLICATIONS

Qualcomm Incorporated; "On Idle Mode Inter-Frequency Measurement for Potential Scell Candidate for Faster Scell Configuration", 3GPP Draft, R4-1712856 on Idle Mode Inter-Frequency Measurement for Potential Scell Candidate for Faster Scell Configuration, $3^{rd}$ Generation Partnership Project (3GPP), Mobile Competence Centre 650, vol. RAN WG4, no. Reno, USA; Nov. 27, 2017-Dec. 1, 2017 XP051367014; http://www.3gpp.org/ftp/tsg%5Fran/WG4%5FRadio/TSGR4%5F85/Docs/ retrieved on Nov. 17, 2017 section 1.
Ericsson (Rapporteur). R2-19xxxxx. Email discussion summary [106#38][NR/DCCA] SCG and MCG SCell Configuration with RRC Resume. 3GPP_TSG_RAN_WG2@LIST.ETSI.ORG: 3GPP, Jul. 14, 2019.
3GPP TS 38.331 V15.6.0 (Jun. 2019). 3rd Generation Partnership Project; Technical Specification Group Radio Access Network; NR; Radio Resource Control (RRC) protocol specification (Release 15). Jun. 29, 2019.
3GPP TR 36.842 V12.0.0 (Dec. 2013). 3rd Generation Partnership Project; Technical. Specification Group Radio Access Network; Study on Small Cell enhancements for E_UTRA and E_UTRAN; Higher layer aspects (Release 12). 71 pgs.

* cited by examiner

ENHANCED BLIND CONFIGURATION OF A CELL

FIELD

The following example embodiments relate to utilization of cells in a cellular communication network.

BACKGROUND

As resources are limited, it is desirable to optimize the usage of network resources. A cell in a cellular communication network may be utilized such that better service may be provided to one or more terminal devices. The optimization of the usage of one or more cells may therefore enable better usage of resources and enhanced user experience to a user of a terminal device.

BRIEF DESCRIPTION OF THE INVENTION

The scope of protection sought for various embodiments of the invention is set out by the independent claims. The exemplary embodiments and features, if any, described in this specification that do not fall under the scope of the independent claims are to be interpreted as examples useful for understanding various embodiments of the invention.

According to another aspect there is provided an apparatus comprising means for providing a primary cell capable of serving a terminal device; means for determining a candidate secondary cell group, comprising one or more cells that have coverage area within the coverage are of the primary cell; means for determining, from the candidate secondary cell group, a cell that, based on information obtained before or during a connection setup signalling, has the highest probability of being successfully configured as a secondary cell for an inter-site carrier aggregation for the terminal device; and means for configuring the cell as the secondary cell for the inter-site carrier aggregation.

According to another aspect there is provided an apparatus comprising means for detecting a primary cell provided by a primary access node and a secondary cell provided by a secondary access node; means for receiving and transmitting connection set-up signalling with the primary access node, wherein the connection set-up signalling comprises timing advance and initial access beam information; means for receiving configuration information regarding the secondary cell as part of a radio resource control reconfiguration signalling received from the primary access node; and means for receiving data using an inter-site carrier aggregation wherein the secondary cell has been configured for the inter-site carrier aggregation. The present invention in another aspect also relates to a corresponding method.

According to another aspect there is provided an apparatus comprising at least one processor, and at least one memory including a computer program code, wherein the at least one memory and the computer program code are configured, with the at least one processor, to cause the apparatus to: provide a primary cell capable of serving a terminal device; determine a candidate secondary cell group, comprising one or more cells that have coverage area within the coverage are of the primary cell; determine, from the candidate secondary cell group, a cell that, based on information obtained before or during a connection setup signalling, has the highest probability of being successfully configured as a secondary cell for an inter-site carrier aggregation for the terminal device; and configure the cell as the secondary cell for the inter-site carrier aggregation.

According to another aspect there is provided an apparatus comprising at least one processor, and at least one memory including a computer program code, wherein the at least one memory and the computer program code are configured, with the at least one processor, to cause the apparatus to: detect a primary cell provided by a primary access node and a secondary cell provided by a secondary access node; receive and transmit connection set-up signalling with the primary access node, wherein the connection set-up signalling comprises timing advance and initial access beam information; receive configuration information regarding the secondary cell as part of a radio resource control reconfiguration signalling received from the primary access node; and receive data using an inter-site carrier aggregation wherein the secondary cell has been configured for the inter-site carrier aggregation.

According to another aspect there is provided a method comprising providing a primary cell capable of serving a terminal device; determining a candidate secondary cell group, comprising one or more cells that have coverage area within the coverage are of the primary cell; determining, from the candidate secondary cell group, a cell that, based on information obtained before or during a connection setup signalling, has the highest probability of being successfully configured as a secondary cell for an inter-site carrier aggregation for the terminal device; and configuring the cell as the secondary cell for the inter-site carrier aggregation.

According to another aspect there is provided a computer program product readable by a computer and, when executed by the computer, configured to cause the computer to execute a computer process comprising providing a primary cell capable of serving a terminal device; determining a candidate secondary cell group, comprising one or more cells that have coverage area within the coverage are of the primary cell; determining, from the candidate secondary cell group, a cell that, based on information obtained before or during a connection setup signalling, has the highest probability of being successfully configured as a secondary cell for an inter-site carrier aggregation for the terminal device; and configuring the cell as the secondary cell for the inter-site carrier aggregation.

According to another aspect there is provided a computer program product comprising computer-readable medium bearing computer program code embodied therein for use with a computer, the computer program code comprising code for executing providing a primary cell capable of serving a terminal device; determining a candidate secondary cell group, comprising one or more cells that have coverage area within the coverage are of the primary cell; determining, from the candidate secondary cell group, a cell that, based on information obtained before or during a connection setup signalling, has the highest probability of being successfully configured as a secondary cell for an inter-site carrier aggregation for the terminal device; and configuring the cell as the secondary cell for the inter-site carrier aggregation.

LIST OF DRAWINGS

In the following, the invention will be described in greater detail with reference to the embodiments and the accompanying drawings, in which FIG. 1 illustrates an example embodiment of a communication system.

DESCRIPTION OF EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described herein may be implemented in a communication system, such as in at least one of the following: Global System for Mobile Communications (GSM) or any other second generation cellular communication system, Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system. The embodiments are not, however, restricted to the system given as an example but a person skilled in the art may apply the solution to other communication systems provided with necessary properties.

Figure 1:
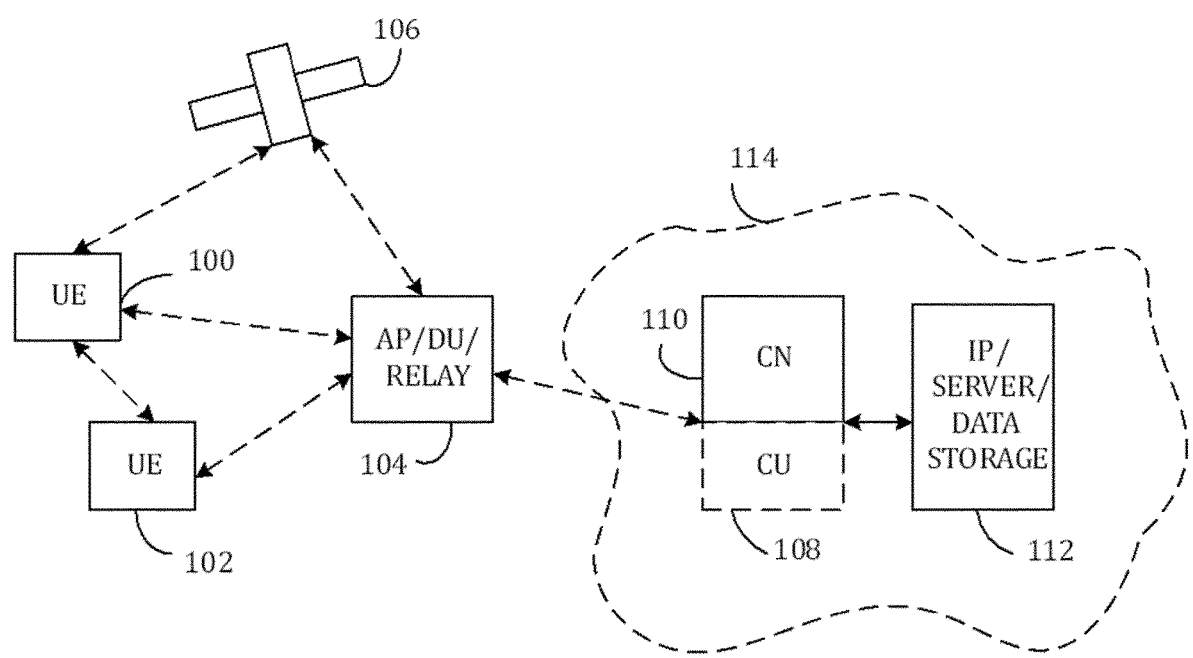

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1. The example of FIG. 1 shows a part of an exemplifying radio access network.

FIG. 1 shows terminal devices 100 and 102 configured to be in a wireless connection on one or more communication channels in a cell with an access node (such as (e/g)NodeB) 104 providing the cell. The physical link from a terminal device to a (e/g)NodeB is called uplink or reverse link and the physical link from the (e/g)NodeB to the terminal device is called downlink or forward link. It should be appreciated that (e/g)NodeBs or their functionalities may be implemented by using any node, host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of terminal devices (UEs) to external packet data networks, or mobile management entity (MME), etc.

The terminal device (also called UE, user equipment, user terminal, user device, etc.) illustrates one type of an apparatus to which resources on the air interface are allocated and assigned, and thus any feature described herein with a terminal device may be implemented with a corresponding apparatus, such as a relay node. An example of such a relay node is a layer 3 relay (self-backhauling relay) towards the base station. Another example of such a relay node is a layer 2 relay. Such a relay node may contain a terminal device part and a Distributed Unit (DU) part. A CU (centralized unit) may coordinate the DU operation via F1AP-interface for example.

The terminal device typically refers to a portable computing device that includes wireless mobile communication devices operating with or without a subscriber identification module (SIM), or an embedded SIM, eSIM, including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A terminal device may also be a device having capability to operate in Internet of Things (IoT) network which is a scenario in which objects are provided with the ability to transfer data over a network without requiring human-to-human or human-to-computer interaction. The terminal device may also utilise cloud. In some applications, a terminal device may comprise a small portable device with radio parts (such as a watch, earphones or eyeglasses) and the computation is carried out in the cloud. The terminal device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is to be noted that the depicted system is only an example of a part of a radio access system and in practice, the system may comprise a plurality of (e/g)NodeBs, the terminal device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

In order to better utilize resources of a cell provided by an access node such as e/gNodeB, carrier aggregation may be utilized. Carrier aggregation, CA, enables higher data transmission rates to be used for a terminal device served by the access node by enabling the terminal device to transmit and receive of data on multiple component carriers from the access node. This is illustrated in FIG. 2a. Access node 210 provides component carriers 212 and 214 that may be used by the terminal device 220 to transmit and receive data. It is to be noted that although two component carriers 212 and 214 are illustrated in FIG. 2A, there may be more component carriers that are provided by the access node 210 and used by the terminal device 220 to transmit and receive data.

Carrier aggregation therefore may assign a plurality of component carriers to one terminal device. A component carrier may be understood as a frequency block and the plurality of component carriers in the carrier aggregation may therefore each be different frequency blocks thereby increasing the bandwidth that may be utilized for data transmission and receival between the access node 210 and the terminal device 220. Various types of carrier aggregation may exist. For example, so called intra-band contiguous carrier aggregation in which the plurality of component carriers are contiguous in the same frequency band. In another example, the plurality of component carriers are separated by gap within the same frequency band. This type of carrier aggregation may be called as intra-band non-contiguous. In yet another example, in so called inter-band carrier aggregation the plurality of component carriers are in different frequency bands.

Figure 2B:
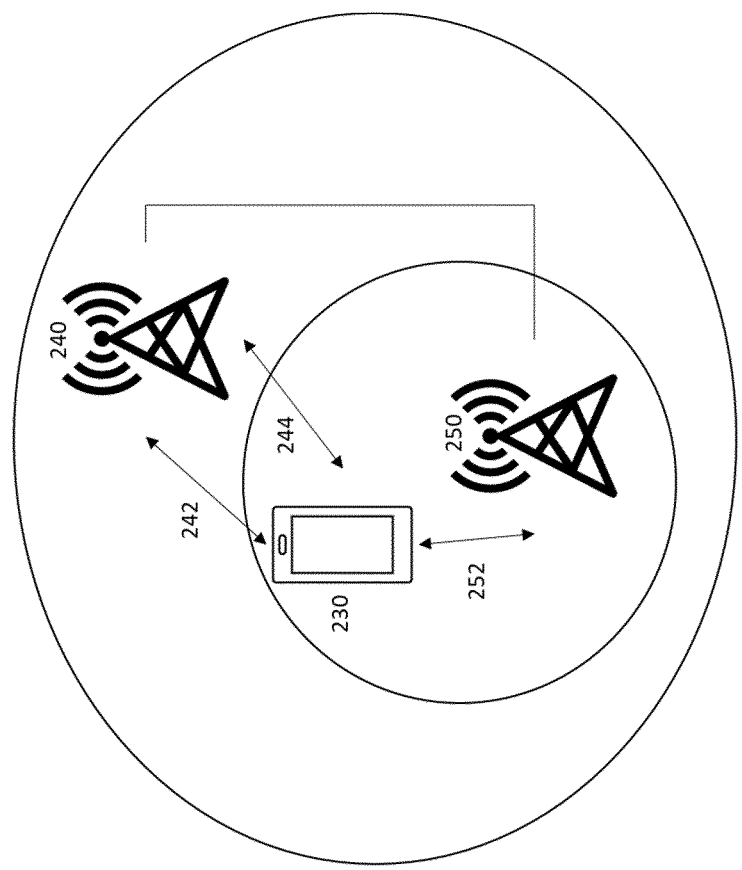
FIGS. 2a and 2b illustrate exemplary embodiments of carrier aggregation and dual connectivity.
Figure 2A:
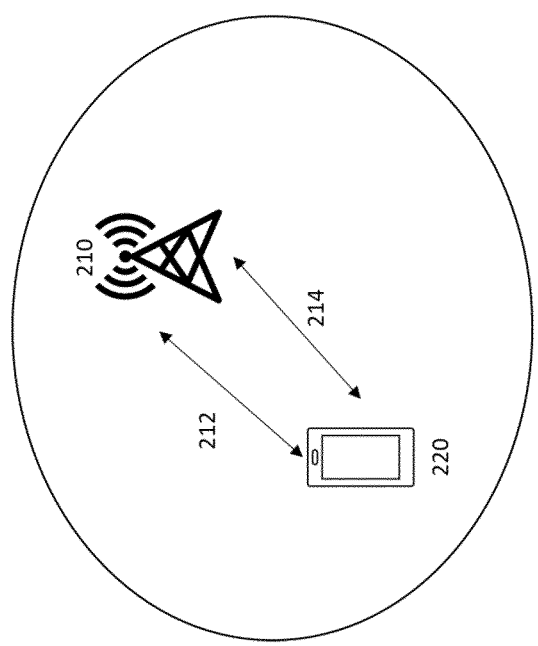

FIG. 2b illustrates dual connectivity. In dual connectivity the terminal device 230 may transmit and receive data from two access nodes 240 and 250 simultaneously. One of the two access nodes may in such exemplary embodiment act as a master access node, which may also be called as a primary access node, through which the connectivity to the secondary access node may be handled. In this exemplary embodiment access node 240 is the master access node. As in dual connectivity a terminal may utilize resources from two radio sites, it may also be referred to as inter-site carrier aggregation. In the exemplary embodiment of FIG. 2b, the component carriers that may be used by the terminal device are the component carriers 242, 244 and 252.

The access nodes 240 and 250 may be any suitable access nodes such as e/gNodeB. In this exemplary embodiment, the access node 240 is an eNodeB and the access node 250 is a gNodeB. The access node 240 thereby provides a larger cell coverage than the access node 250. Access node 250 then on the other hand provides greater capacity than access node 240. In other words, while 4G may provide coverage, 5G may be utilized for capacity for the terminal device 230 thereby allowing 5G to utilize existing 4G infrastructure. The terminal device 230 may therefore, by utilizing dual connectivity, benefit from two different cell sites simultaneously.

As mentioned above, the geographical coverage of a cell provided by an access node may vary. For example, a 4G cell may have a greater coverage area than a 5G cell and/or one 5G cell may have greater cell coverage than another 5G cell. A small cell may therefore be understood to refer to a cell that has a smaller geographical coverage area than another cell. In some exemplary embodiments a macrocell is a cell with the greatest geographical coverage area of a plurality of cells and the smaller cell may be called as small cells. Therefore, a macrocell may cover a geographical area that comprises multiple small cells such as femtocells, picocells and/or microcells. Utilization of small cells may allow the same frequencies of an available frequency spectrum to be re-used within the coverage area provided by the macrocell.

It is to be noted that in some exemplary embodiments of CA and/or inter-site CA, the cells are controlled by the same gNodeB. In such exemplary embodiments a primary cell, PCell, and candidate secondary cells, SCells, are controlled by the gNodeB. In DC, the cells are in different gNB: PCell+SCells and PSCell+SCells are in different cell groups, called MCG respectively SCG.

Figure 3:
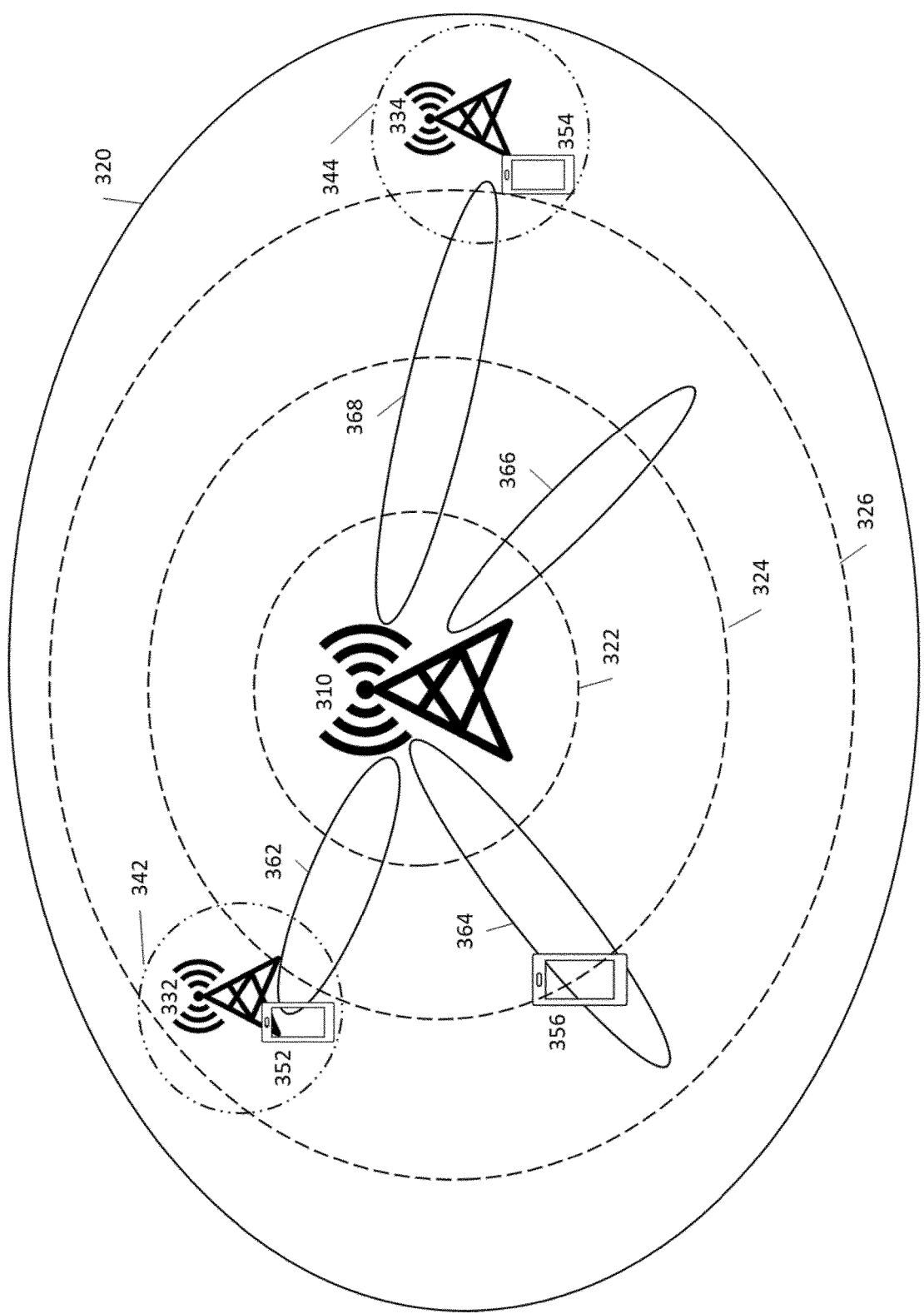
FIGS. 3-6 illustrate and exemplary embodiments of inter-site carrier aggregation.

FIG. 3 illustrates an exemplary embodiment of inter-site carrier aggregation in which an access node 310 provides a cell 320 that in this exemplary embodiment is a macrocell. The access node 310 in this exemplary embodiment is a gNodeB, but it could alternatively be an eNode B or any other suitable access node. Access node 332 provides a cell 342 that has smaller geographical coverage than the cell 320 and access node 334 also provides a cell 344 that has smaller geographical coverage than the cell 320. Therefore cells 342 and 344 may be considered as small cells. The cells 342 and 344 both are located within the cell 320, but the cells 342 and 344 do not overlap in this exemplary embodiment. The access nodes 332 and 334 are in this exemplary embodiment gNodeBs, but in some alternative exemplary embodiments, the access nodes 332 and 334 could be any other suitable access nodes that provide small cells.

Terminal devices 352, 354 and 356 are located within the cell 320 and are also served by the access node 310. It is to be noted that there could be also other terminal devices that are served by the access node 310 than the terminal devices 352, 354 and 356 illustrated in FIG. 3. Inter-site carrier aggregation may now be utilized for those terminal devices that are within a small cell that is located within the cell 320. In this exemplary embodiment, the terminal device 352 is located within the cell 342 and may be served by the access node 332. On the other hand, the terminal device 356 is not located within any of the small cells within the cell 320 in this exemplary embodiment.

If inter-site carrier aggregation is to be utilized, the access node 310, which may be considered as the master, or primary, access node, is to configure a small cell for the inter-site carrier aggregation. To determine which small cell or cells to configure for the inter-site carrier aggregation the access node 310 may utilize information received from measurement results provided by the terminal devices within the small cells. For example, inter frequency measurement results could be used. Yet, this requires resources from the terminal devices and also requires time thereby increasing the required time before the inter-cell carrier aggregation may be utilized. If measurement results regarding multiple small cells are available, the access node 310 may determine which small cell provides the best service for a terminal device for which inter-site carrier aggregation is to be utilized. The access node 310 may also determine if a terminal device is located in an area that has coverage of a small cell. In FIG. 3 it is illustrated that the terminal device 356 for example is not located within a coverage area of a small cell and therefore inter-site carrier aggregation may not be utilized for terminal device 356.

To achieve faster configuration of one or more small cells for the purpose of the inter-site carrier aggregation, the access node 310 may use so called blind configuration to configure a small cell as a secondary cell for the inter-site carrier aggregation for a terminal device. In blind configuration the access node 310 configures a small cell for a terminal device without having measurement results regarding the small cell provided by the terminal device available. Blind configuration therefore may help to save resources of the terminal device and on the other hand reduce the time needed before the small cell has been configured for the inter-site carrier aggregation. Thus, the access node 310 does not have information regarding if the terminal device has detected the small cell to be configured or not. Blind configuration may therefore not provide a successful inter-site carrier aggregation if the terminal device, such as the terminal device 356, is not located within a coverage area of the small cell, such as the small cell 342 or 344, that is configured as a secondary cell for the inter-site carrier aggregation. Blind configuration may therefore not be reliable for inter-site carrier aggregation.

In order to improve the reliability of blind configuration for inter-site carrier aggregation, information that is readily available for the access node 310 may be utilized. Readily available information may comprise information that has been obtained by the access node 310 before or during connection set-up signalling between the access node 310 and a terminal device, such as terminal device 352, 354 or 356, for which inter-site carrier aggregation is to be setup or configured.

Readily available information may comprise, in some exemplary embodiments, historical information. The historical information may comprise information regarding success of previous inter-site carrier aggregation configuration or setting up attempts and if those were successful or not. A successful configuration may be understood as configuration that enables inter-site carrier aggregation to be utilized with the small cell that was chosen for the inter-site carrier aggregation. Based on this information the involvement of small cells within the coverage area 320 in successful inter-site carrier aggregation setups may be determined. Further, a success rate for each small cell may thereby be determined.

If it is determined by the access node 310 that an inter-site carrier aggregation is to be setup for a terminal device, such as such as terminal device 352, 354 or 356, the historical information may be utilized when determining which small cell to configure for the inter-site carrier aggregation. For example, the small cells with highest success rates may be determined and, in some exemplary embodiments, the small cell with the highest success rate may be configured for the inter-site carrier aggregation. This may be beneficial for example when the access node 310 does not have prior information regarding the terminal device for which the inter-site carrier aggregation is to be setup.

Alternatively, or additionally, in some exemplary embodiments, it may be determined from the historical information which small cells have been most often configured for inter-site carrier aggregation. The cells used most often may therefore be determined and in some exemplary embodiments the cell that has been most often been used for inter-site carrier aggregation may be selected as the cell that is to be configured for the inter-site carrier aggregation. This may be beneficial for example when the access node 310 does not have prior information regarding the terminal device for which the inter-site carrier aggregation is to be setup.

In some exemplary embodiments, small cells with the highest probability of being successfully configured for inter-site carrier aggregation may be determined based on the success rate and/or how often a cell has been configured for inter-site carrier aggregation. These determined small cells may then be considered as a candidate secondary cell group for inter-site carrier aggregation. The candidate cells may then be further filtered based on for example timing advance, TA, and/or based on the angle of arrival of the UE initial access beam, such as beams 362, 364, 366 and 368. Based on the timing advance, the distance of a terminal device from the access node and thereby the location of the terminal device within the master cell may be determined.

In some exemplary embodiments the access node 310 may have served a terminal device, for which the inter-site carrier aggregation is to be configured, before and the historical information may comprise information regarding that. In such an exemplary embodiment the historical data may be used to determine which cell has been used most often for the inter-site carrier aggregation for that terminal device. The most used cell may then be configured for the inter-cell carrier aggregation.

In some exemplary embodiments, if a cell is determined to be a candidate cell for the inter-cell carrier aggregation and is determined as the cell to be configured, but the cell already has a load higher than a threshold value, it may be determined that the cell is not to be configured for the inter-site carrier aggregation. In such case, the next best candidate cell for example may be configured for the inter-site carrier aggregation.

If historical information is used to determine a candidate secondary cell group or a secondary cell to be configured for the inter-site carrier aggregation, the historical information may be calibrated. The calibration may take place periodically or randomly. The calibration may be done based on inter frequency measurement that have been received. For example, if same historical data is continuously used to select a candidate secondary cell group or a secondary cell to be configured for the inter-site carrier aggregation, a bias may be formed towards certain cell even though some other cells might provide better performance. Therefore, it may be beneficial to calibrate the historical information with more recent inter frequency measurements from time to time.

Based on timing advance, the master cell 320 may be divided in to different distance levels, such as the distance levels 322, 324 and 326. This may be called as distance slicing. If the location of a terminal device may be determined, or estimated, a candidate cell with a location corresponding to the location of the terminal device may be configured for the inter-site carrier aggregation. For example, as illustrated in FIG. 3, the terminal device 354 may be determined to be between the distance levels 326 and the edge of the cell 320 and the cell 344 provided by the access node 334 is determined to be at a corresponding distance from the access node 310. Further, from the angle of arrival of the initial access beam 368 the direction of the terminal device 354 from the access node 310 may be determined. Thus, the cell 344 may be configured for the inter-site carrier aggregation that is to serve the terminal device 354 as its direction and distance from the access node 310 corresponds to those of the terminal device 354. Also, as illustrated in FIG. 3, the terminal device 352 may be determined to be between the distance levels 324 and 326 and the cell 342 provided by the access node 332 is determined to be at a corresponding distance from the access node 310. Further, from the angle of arrival of the initial access beam 362 the direction of the terminal device 352 from the access node 310 may be determined. Thus, the cell 342 may be configured for the inter-site carrier aggregation that is to serve the terminal device 352 as its direction and distance from the access node 310 corresponds to those of the terminal device 352. Yet, in some exemplary embodiments, if the candidate cells do not comprise a small cell that is determined to correspond to the location of the terminal device such as the terminal device 356, the access node 310 may refrain from attempting to configure a small cell for the inter-site carrier aggregations for the terminal device 356. It is to be noted that in some exemplary embodiments it may be determined, by the access node, that none of the candidate cells are expected to be good. For example, it may be determined that none of the candidate cells could be successfully configured for the inter-site carrier aggregation. In such case it is possible for the access node to refrain from configuring a candidate cell for the inter-site carrier aggregation.

When determining the small cell to be configured for the inter-site carrier aggregation, the day and time of the day may also be taken into account in some exemplary embodiments. The historical information may comprise information regarding most optimal cells when taking time and day into account as well.

In some exemplary embodiments power boosting may additionally be used. A secondary cell that has been selected among the candidate cells for the inter-site connection may not be the most optimal secondary cell for the terminal device and therefore power boosting some bandwidth parts and/or other resources may enable successfully configuring the candidate cell for the inter-site carrier aggregation. Additionally, in some exemplary embodiments, after the first connection to the secondary cell is performed, it may be checked how far the power boosting is really needed for the selected secondary cell. In case it is determined that there is good connectivity the power boosting may be switched off for the further data transmission. The messages needed for checking the need for power boosting may be predefined downlink control information, DCI, or medium access control control element, MAC CE messages which may enable fast and efficient process.

Further, besides power boosting, other means to ensure an improved connectivity for some time may be utilized. For example, by reducing interference from adjacent cells that may cause interference. Thus, it may be beneficial to use power boosting and interference reduction, for example, to improving the connectivity.

Figure 4:
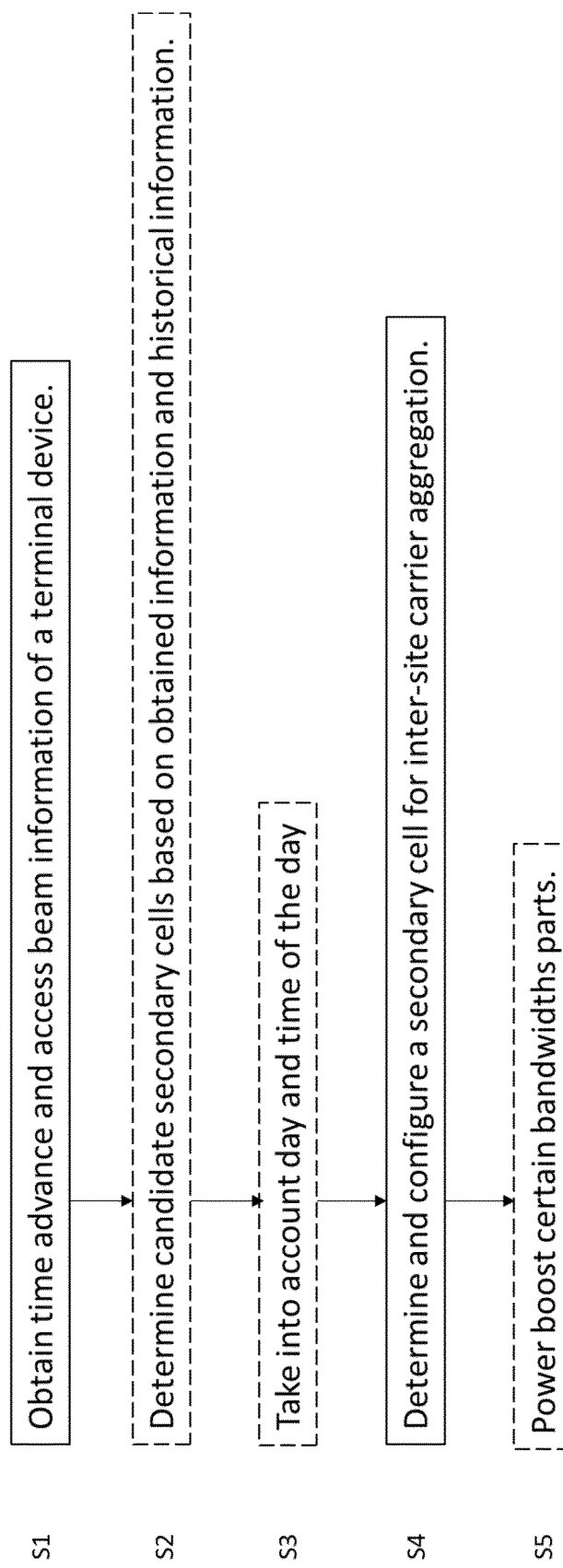

FIG. 4 illustrates a flow chart according to an exemplary embodiment. In S1 an access node, such as access node 310, that provides a primary cell obtains timing advance and access beam information of a terminal device. Next in S2, which may be an optional step, candidate secondary cells for inter-site carrier aggregation are determined by the access node based on the obtained information and based on historical information that is available for the access node. In step S3, which may also be an optional step, the day and time of the day are further taken into account when determining candidate secondary cells. Next, a secondary cell from the candidate secondary cells is determined and configured for inter-site carrier aggregation as illustrated in S4.

Figure 5:
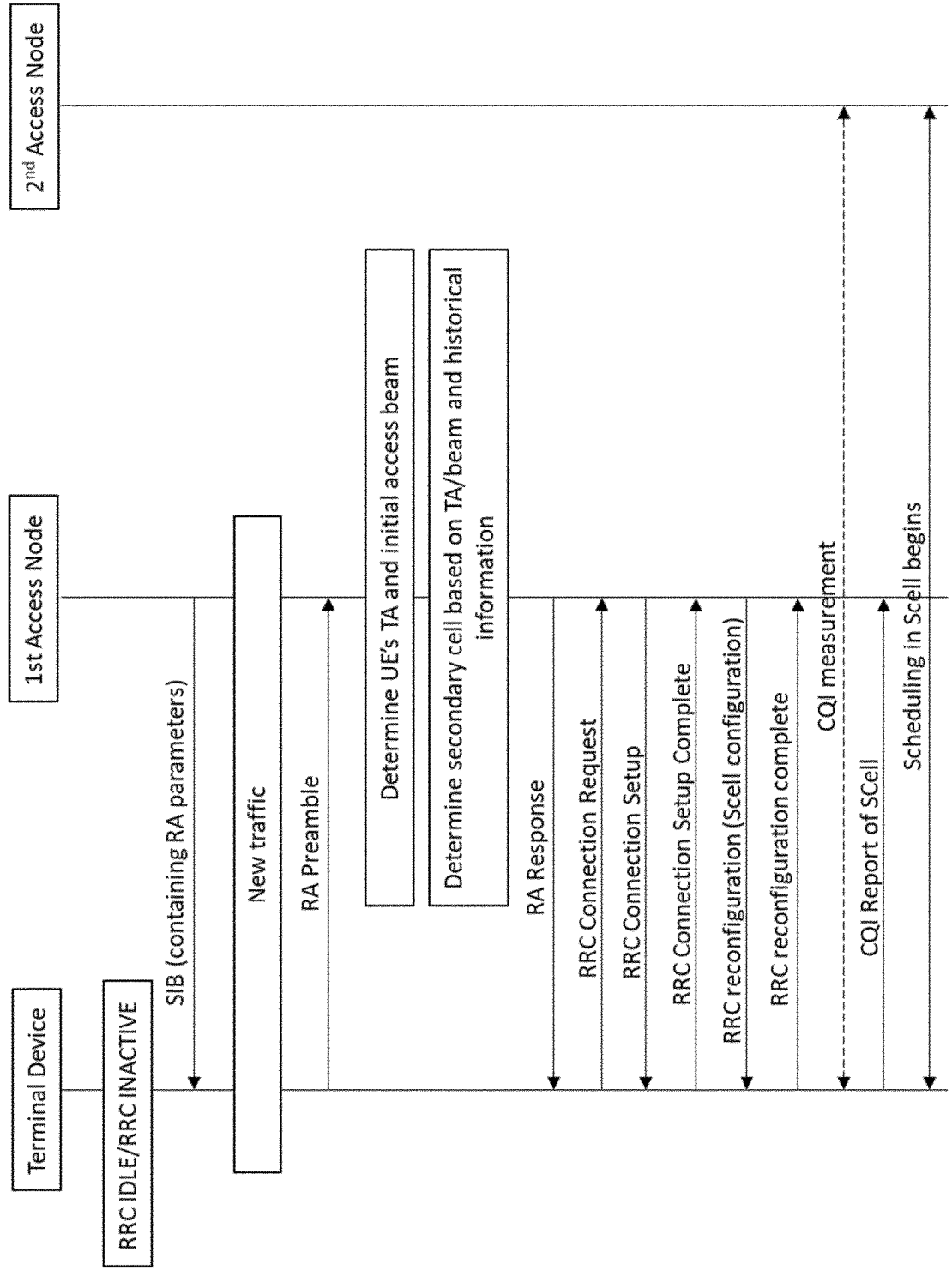

FIG. 5 illustrates signalling according to an exemplary embodiment. A terminal device may be any suitable terminal device such as terminal devices 352, 354 or 356. The first access node is the access node that provides the primary cell. The access node may be any suitable access node such as the access node 310. The second access node provides a cell that may be configured to be a secondary cell. The second access node may be any suitable access node such as access node 332 or 334.

The terminal device is first in an idle or inactive state, in other words in a Radio Resource Control, RRC Idle or inactive state. Next the first access node provides a System Information Block, SIB, signal to the terminal device. The SIB contains Radio Access, RA, parameters. Next, new traffic is enabled. The terminal device then sends RA preamble signal to the first access node. The RA Preamble signal comprises information based on which the timing advance and initial access beam of the terminal device may be determined by the first access node. Then the first access node then determines a secondary cell for inter-site carrier aggregation based on historical data and the determined timing advance and initial access beam of the terminal device. Next the first access node sends a RA Response to the terminal device. The terminal device then sends an RRC Connection request to which the first access nodes responds by sending an RRC Connection Setup signal. The Terminal device then sends an RRC Connection Setup Complete signal to the first access node. The first access node then sends an RRC reconfiguration signal that includes the secondary cell, SCell, configuration information and the terminal device responds by sending an RRC reconfiguration complete signal. Next, Channel Quality Information, CQI, measurement signalling may take place between the terminal device and the second access node. The terminal device also provides a CQI Report of the secondary cell to the first access node. Then scheduling in the secondary cell for the terminal device may begin.

As can be seen in FIG. 5, the terminal device does not have to provide measurements, such as inter frequency measurements, regarding the cell provided by the second access node before the second access node is configured, by the first access node, to the inter-site carrier aggregation. This may save resources of the terminal device as well as make the inter-site carrier aggregation setup faster. Also, as the timing advance and initial access beam of the terminal device along with historical information are used to determine the secondary cell, the accuracy of blind configuration of a secondary cell may be improved. In some exemplary embodiments, intra-frequency neighbour cell beams may be used in addition to the timing advance and initial access beam of the terminal device and historical information when determining a secondary cell.

In a further exemplary embodiment, an access node may be configured to execute one or more algorithms that cause the access node to perform the following functionality. It is determined that a terminal device is to be configured for inter-site carrier aggregation. If there is no historical information available to the access node regarding the terminal device, then based on historical information regarding the secondary cells to which the access node has previously offloaded most of terminal devices that were to be configured for inter-site carrier aggregation, one or more candidate secondary cells are determined by the access node. In other words, the one or more candidate secondary cells are determined based on popularity determined from historical information. Alternatively, or additionally, the historical success of a cell being configured as a secondary cell for inter-site carrier aggregation may be determined and used as a basis for determining the one or more candidate secondary cells.

If there are more than one candidate secondary cells, the candidate secondary cells may further be filtered based on information obtained in the course of regular connection establishment and/or resume. The information may comprise for example terminal device uplink timing advance based on which distance slicing of the cell may be determined by the access node providing the primary cell. Terminal device uplink timing advance may be known by the terminal device and the access node (e.g. from random access channel, RACH). A secondary cell may thus be selected based on historical probability of using a cell as a secondary cell, given the uplink timing advance. This approach is applicable to LTE and NR, for example.

Alternatively, or additionally, initial access beam, based on which angle of arrival slicing of the cell may be determined, by the access node providing the primary cell. Initial access beam may be known for example from RACH. A secondary cell may then be selected based on historical probability of a cell being configured as a secondary cell, given the used access beam, which may be an initial access beam. This approach is applicable to NR, for example.

Alternatively, if previous historical information regarding the terminal device is available to the access node, based on previous connection history (e.g. 10 bins/terminal device, and/or the small cell last used), the access node configures the most used cell as a secondary cell in the past. The most used may be the most used for the terminal device. Additionally, the day and time of the day may also be considered when determining the cell to be configured as a secondary cell.

Additionally, power boosting may be used on certain BWPs/resources for cell range extension of the candidate cells so that the terminal device may efficiently communicate with a second-best secondary cell. This may reduce the cost of guessing slightly incorrectly the cell to be configured as a secondary cell.

In this exemplary embodiment, the access node collects the following information: 1. At connection setup, during RACH procedure, obtain at least one of UL TA and initial access beam information of the UE; Based on the information determine a secondary cell, SCell, to be configured for the UE; Configure UE with the SCell.

2. 1+the determining is done based on which SCell was most commonly used for UEs in the similar UL TA and/or initial access beam categories.

3. 1 or 2+the determining is based on previous SCell connection history of the UE.

4. 3+the determining is adjusted based on at least one of weekday and time of day.

5. Any of 1-4 above added to the used BWP information combined with the connection throughput over the Scell.

In one example, adapt/override the ranking based on historical usage when there is high small cell load. If a cell has a high load, select the next one on the list. One outcome may be that none of the small cells are expected to be good. Or one other outcome is to use a combination of TA and serving cell beam plus intra-frequency neighbour cells beams.

In an example embodiment, in addition to the angle of arrival slicing of the cell (in the PCell or PSCell), the beam can also slice the cell along vertical angle/dimension. The fundamental procedure can still remain the same: The NW configures UE with the small cell having the highest chance of being successful—given the UE timing advance and initial access beam information.

In another exemplary embodiment one might define mutually orthogonal—or overlapping—groups of SCs for the given scenario, which are then broad- or multi-casted from the gNB to the UEs. The benefit is the increased likelihood to blindly detect the best fitting group compared to selecting a single cell of this group.

Figure 6:
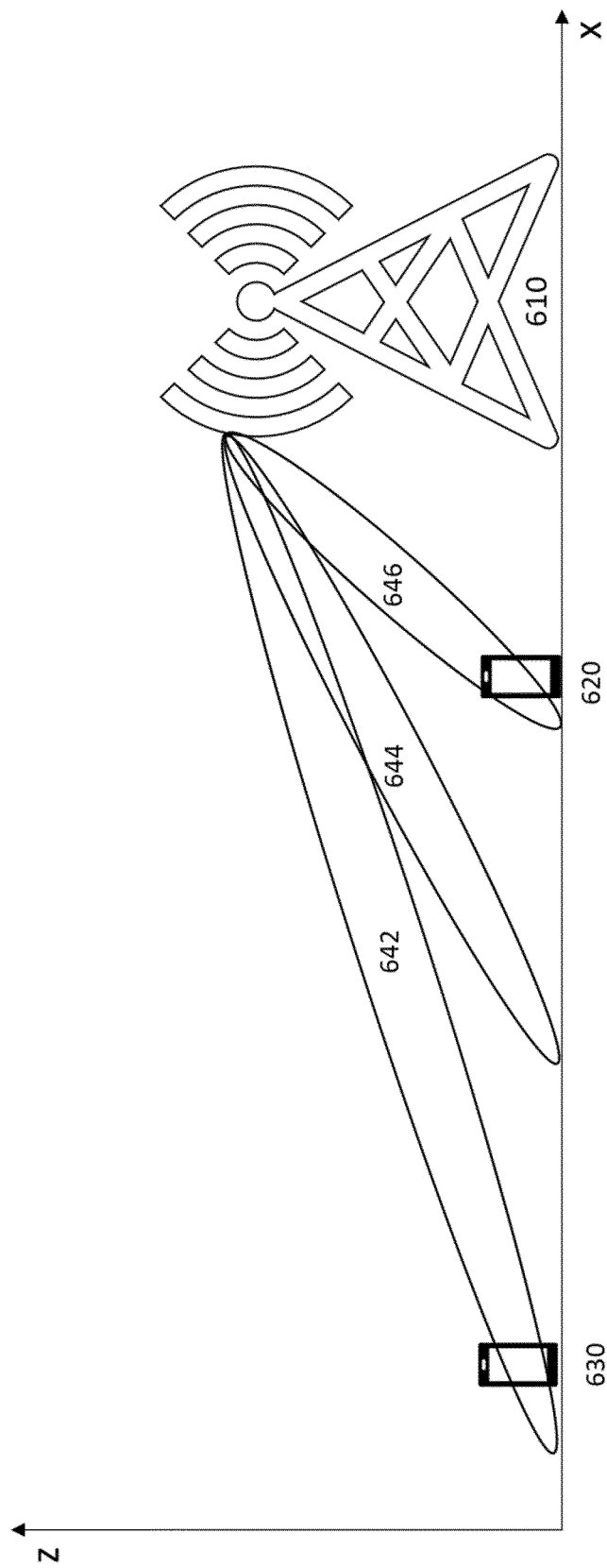

In a hierarchical process the UE might afterwards select the best fitting cell from the best fitting group by conventional means and measurements. Such group based processing provides the further option to compensate over a short time duration miss detections of the UE by, e.g., using means like coordinated beamforming (for example reduce inter small cell interference), SFN transmission (for example increasing coverage of the cell group at the cost of efficiency and consequently limit to short time periods) FIG. 6 illustrates how a primary cell provided by an access node 610 may be sliced in a vertical dimension. Initial access beams 642, 644 and 646 are provided by the access node 610. As terminal device 630 is further away from the access node 610 than terminal device 620, the initial access beam used by terminal device 630 is therefore the initial access beam 642 that corresponds to the position of the terminal device 630 in vertical dimension. On the other hand, the terminal device 620 is closer to the access node 610 and uses the initial access beam 646 respectively. It is to be noted that in this exemplary embodiment the access node 610 may, like in previous exemplary embodiments, configure for the inter-site carrier aggregation the candidate cell that is determined to have the highest probability to be successfully configured for the inter-site carrier aggregation.

In some exemplary embodiments the access node providing the primary cell may broadcast or multicast a group of candidate secondary cells that are mutually orthogonal or overlapping to a terminal device. Thereby the likelihood of successful blind configuration may be further increased. Additionally, the terminal device may then afterwards select the candidate secondary cell that provides the best service for the inter-site carrier aggregation.

Broadcasting or multicasting a group of candidate secondary cells may help to compensate in case the terminal device did not detect one or more of the available secondary cells that may be small cells. For example, coordinated beamforming may be used thereby reducing inter small cell interference. Additionally, or alternatively, single-frequency network, SFN, transmission may used such that several transmitters transmit simultaneously the same signal over the same frequency channel. This increases coverage of the candidate secondary cell groups. It may be beneficial to limit the SFN transmission to short time periods in order to save resources.

Figure 7:
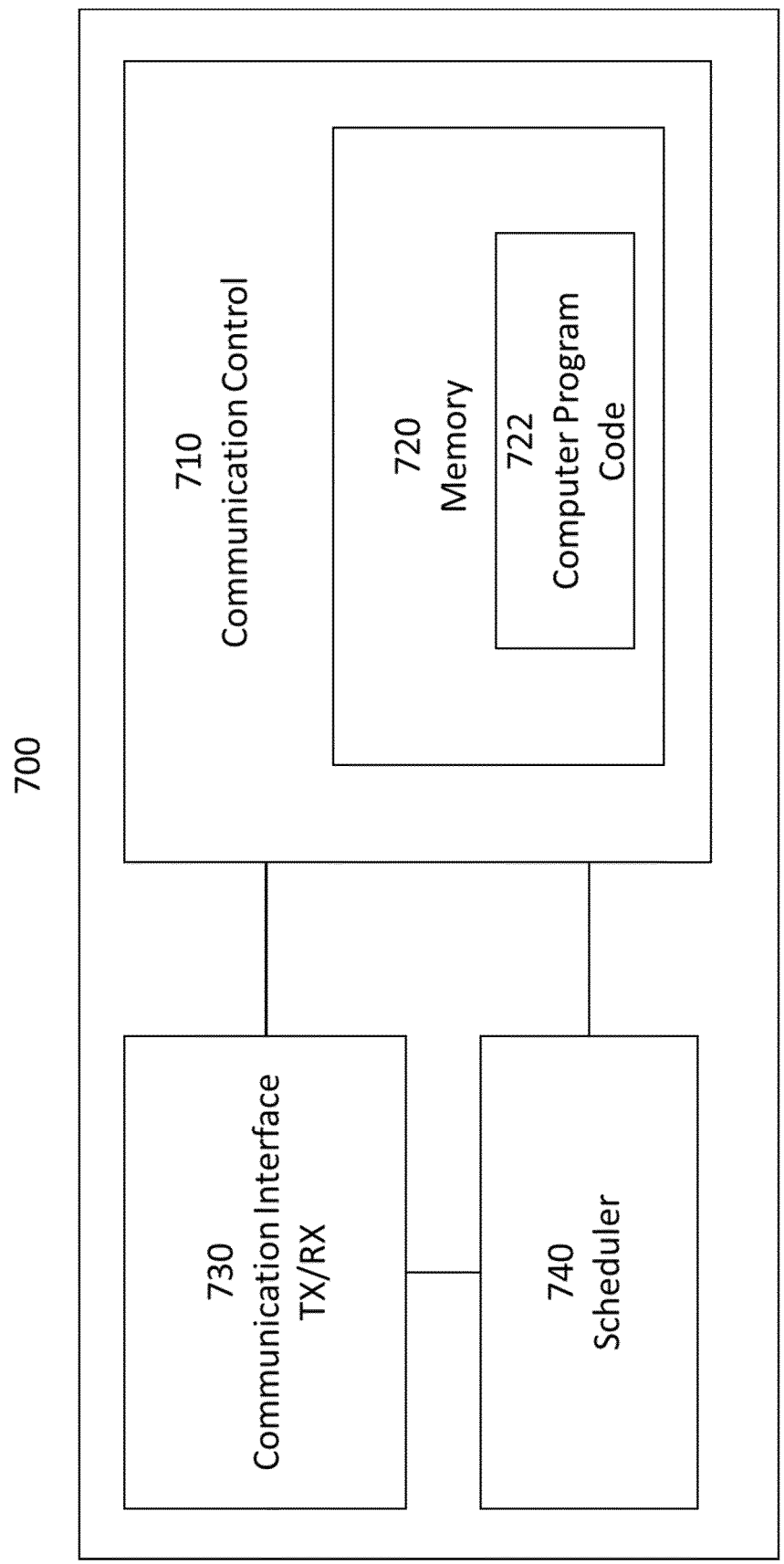
FIGS. 7 and 8 illustrate exemplary embodiments of an apparatus.

The apparatus 700 of FIG. 7 illustrates an example embodiment of an apparatus that may be an access node or be comprised in an access node. The apparatus may be, for example, a circuitry or a chipset applicable to an access node to realize the described embodiments. The apparatus 700 may be an electronic device comprising one or more electronic circuitries. The apparatus 700 may comprise a communication control circuitry 710 such as at least one processor, and at least one memory 720 including a computer program code (software) 722 wherein the at least one memory and the computer program code (software) 722 are configured, with the at least one processor, to cause the apparatus 700 to carry out any one of the example embodiments of the access node described above.

The memory 720 may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store current neighbour cell list, and, in some example embodiments, structures of the frames used in the detected neighbour cells.

The apparatus 700 may further comprise a communication interface 730 comprising hardware and/or software for realizing communication connectivity according to one or more communication protocols. The communication interface (530) may provide the apparatus with radio communication capabilities to communicate in the cellular communication system. The communication interface may, for example, provide a radio interface to terminal devices. The apparatus 700 may further comprise another interface towards a core network such as the network coordinator apparatus and/or to the access nodes of the cellular communication system. The apparatus 700 may further comprise a scheduler 740 that is configured to allocate resources.

Figure 8:
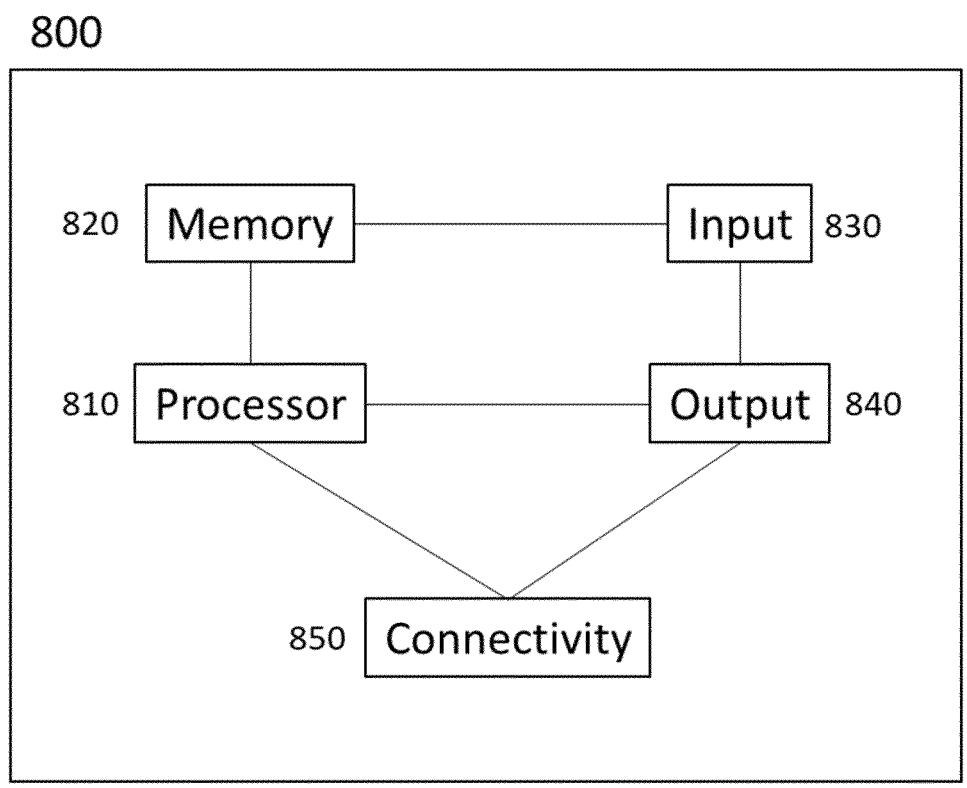

FIG. 8 illustrates an apparatus 800, which may be a terminal device, according to an example embodiment. The apparatus 800 comprises a processor 810. The processor 810 interprets computer program instructions and process data. The processor 810 may comprise one or more programmable processors. The processor 810 may comprise programmable hardware with embedded firmware and may, alternatively or additionally, comprise one or more application specific integrated circuits, ASICs.

The processor 810 is coupled to a memory 820. The processor is configured to read and write data to and from the memory 820. The memory 820 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 820 stores computer readable instructions that are execute by the processor 810. For example, non-volatile memory stores the computer readable instructions and the processor 810 executes the instructions using volatile memory for temporary storage of data and/or instructions.

The computer readable instructions may have been pre-stored to the memory 820 or, alternatively or additionally, they may be received, by the apparatus, via electromagnetic carrier signal and/or may be copied from a physical entity such as computer program product. Execution of the computer readable instructions causes the apparatus 800 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

The apparatus 800 further comprises, or is connected to, an input unit 830. The input unit 830 comprises one or more interfaces for receiving a user input. The one or more interfaces may comprise for example one or more motion and/or orientation sensors, one or more cameras, one or more accelerometers, one or more microphones, one or more buttons and one or more touch detection units. Further, the input unit 830 may comprise an interface to which external devices may connect to.

The apparatus 800 also comprises an output unit 840. The output unit comprises or is connected to one or more displays capable of rendering visual content such as a light emitting diode, LED, display, a liquid crystal display, LCD and a liquid crystal on silicon, LCoS, display. The output unit 840 may comprise two displays to render stereoscopic visual content. One display to render content to the left eye and the other display to render content to the right eye. The output unit 840 may further comprise a transmission unit, such as one or more waveguides or one or more lenses, to transfer the rendered visual content to the user's field of view. The output unit 840 further comprises one or more audio outputs. The one or more audio outputs may be for example loudspeakers or a set of headphones.

The apparatus 800 may further comprise a connectivity unit 850. The connectivity unit 850 enables wired and/or wireless connectivity to external networks. The connectivity unit 850 may comprise one or more antennas and one or more receivers that may be integrated to the apparatus 800 or the apparatus 800 may be connected to. The connectivity unit 850 may comprise an integrated circuit or a set of integrated circuits that provide the wireless communication capability for the apparatus 800. Alternatively, the wireless connectivity may be a hardwired application specific integrated circuit, ASIC.

It is to be noted that the apparatus 800 may further comprise various component not illustrated in the FIG. 8. The various components may be hardware component and/or software components.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2 to 4 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising at least one processor, and at least one memory including a computer program code, wherein the at least one memory and the computer program code are configured, with the at least one processor, to cause the apparatus to:
provide a primary cell capable of serving a terminal device;
determine a candidate secondary cell group, comprising one or more cells that have coverage area within a coverage area of the primary cell;
determine, from the candidate secondary cell group, a cell that, based on information obtained before or during a connection setup signalling, has the highest probability of being successfully configured in a blind configuration as a secondary cell for an inter-site carrier aggregation for the terminal device, wherein the information obtained before or during the connection setup signalling comprises timing advance and/or access beam information of the terminal device;
determine distance of the terminal device based on the timing advance of the terminal device;
configure in the blind configuration the cell as the secondary cell for the inter-site carrier aggregation; and
determine that a plurality of cells of the candidate secondary cell group are to be broadcasted or multi-casted to the terminal device.

2. The apparatus according to claim 1, wherein the information obtained before or during the connection setup signalling comprises historical information.

3. The apparatus according to claim 2, wherein the historical information is calibrated using inter-frequency measurements.

4. The apparatus according to claim 2, wherein the historical information comprises historical information regarding the terminal device.

5. The apparatus according to claim 1, wherein the probability of being successfully configured as a secondary cell is determined, at least partly, based on being previously successfully configured as a secondary cell for inter-site carrier aggregation.

6. The apparatus according to claim 1, wherein the apparatus is further configured to power boost one or more bandwidth parts.

7. The apparatus according to claim 1, wherein the apparatus is an eNodeB or a gNodeB.

8. A method comprising:
providing a primary cell capable of serving a terminal device;
determining a candidate secondary cell group, comprising one or more cells that have coverage area within a coverage area of the primary cell;
determining, from the candidate secondary cell group, a cell that, based on information obtained before or during a connection setup signalling, has the highest probability of being successfully configured in a blind configuration as a secondary cell for an inter-site carrier aggregation for the terminal device, wherein the information obtained before or during the connection setup signalling comprises timing advance and/or access beam information of the terminal device;
determining distance of the terminal device based on the timing advance of the terminal device;
configuring in the blind configuration the cell as the secondary cell for the inter-site carrier aggregation; and
determining that a plurality of cells of the candidate secondary cell group are to be broadcasted or multi-casted to the terminal device.

9. The method according to claim 8, wherein the information obtained before or during the connection setup signalling comprises historical information.

10. The method according to claim 8, wherein the historical information is calibrated using inter-frequency measurements.

11. The method according to claim 8, wherein the historical information comprises historical information regarding the terminal device.

12. The method according to claim 8, wherein the probability of being successfully configured as a secondary cell is determined, at least partly, based on being previously successfully configured as a secondary cell for inter-site carrier aggregation.

13. The method according to claim 8, wherein the method further comprises power boosting one or more bandwidth parts.

14. A non-transitory computer-readable medium encoded with instructions that, when executed by a processor, cause an apparatus at least to:
provide a primary cell capable of serving a terminal device;
determine a candidate secondary cell group, comprising one or more cells that have coverage area within a coverage area of the primary cell;
determine, from the candidate secondary cell group, a cell that, based on information obtained before or during a connection setup signalling, has the highest probability of being successfully configured in a blind configuration as a secondary cell for an inter-site carrier aggregation for the terminal device, wherein the information obtained before or during the connection setup signalling comprises timing advance and/or access beam information of the terminal device;
determine distance of the terminal device based on the timing advance of the terminal device;
configure in the blind configuration the cell as the secondary cell for the inter-site carrier aggregation; and
determine that a plurality of cells of the candidate secondary cell group are to be broadcasted or multi-casted to the terminal device.

* * * * *